Nov. 29, 1955   L. M. MERRILL ET AL   2,724,869
METHOD OF EMBEDDING TRANSFORMERS
Original Filed Dec. 10, 1949   5 Sheets-Sheet 1
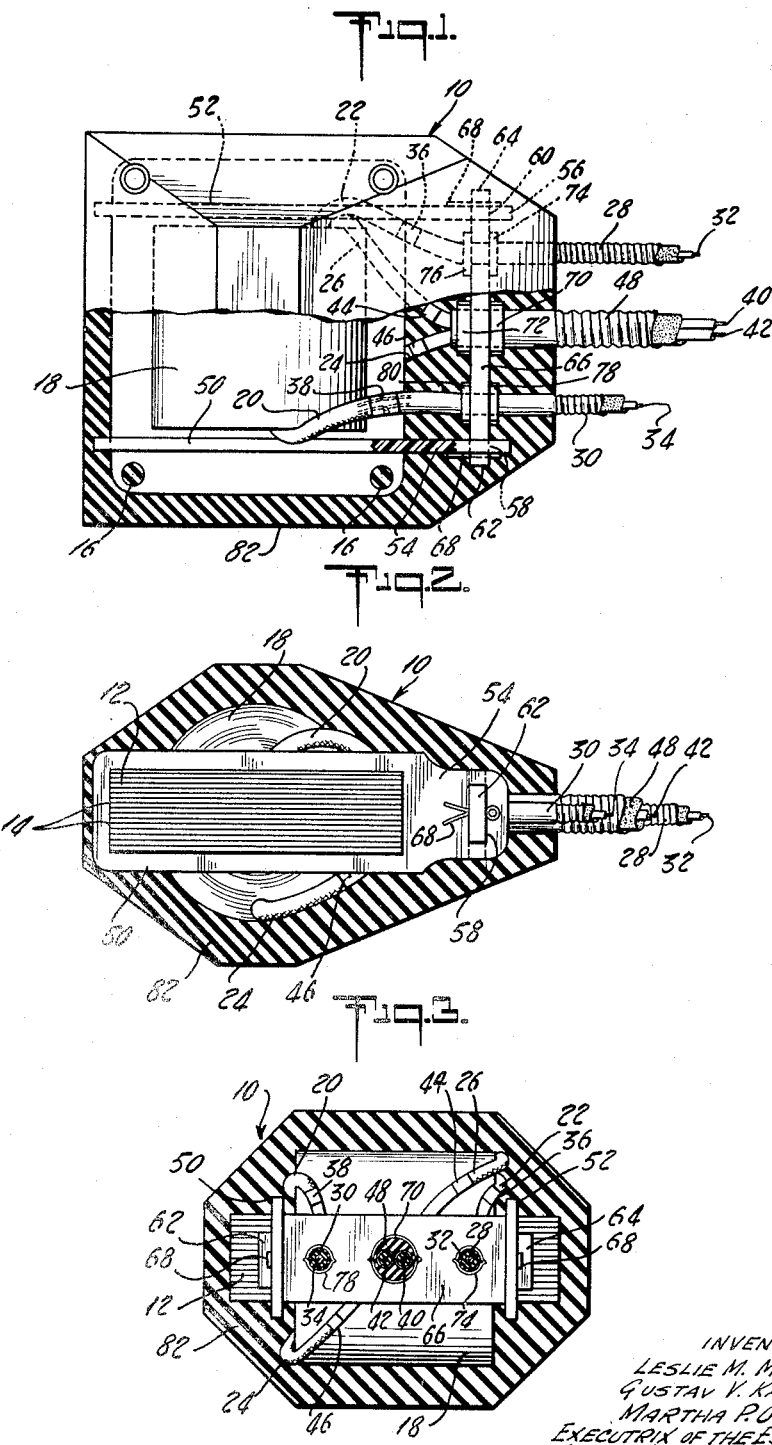
INVENTORS:
LESLIE M. MERRILL
GUSTAV V. KARLSON
MARTHA P. OESTNAES
EXECUTRIX OF THE ESTATE OF
VICTOR L. OESTNAES, DECEASED

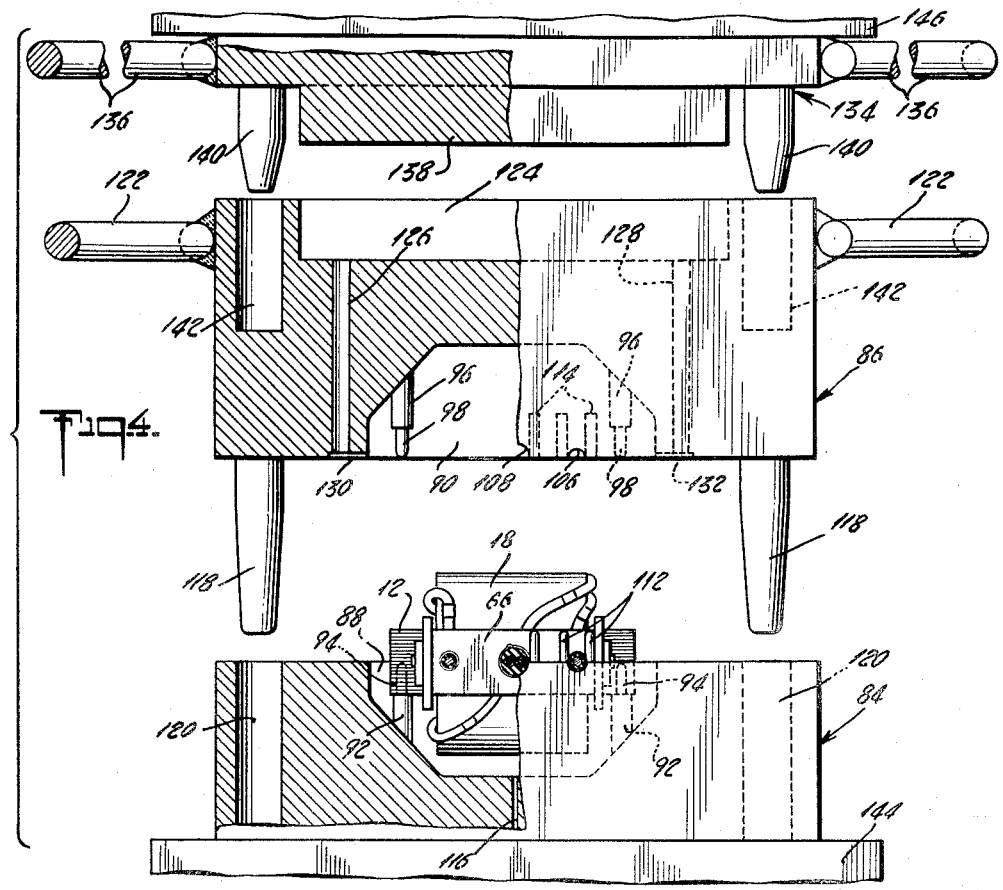
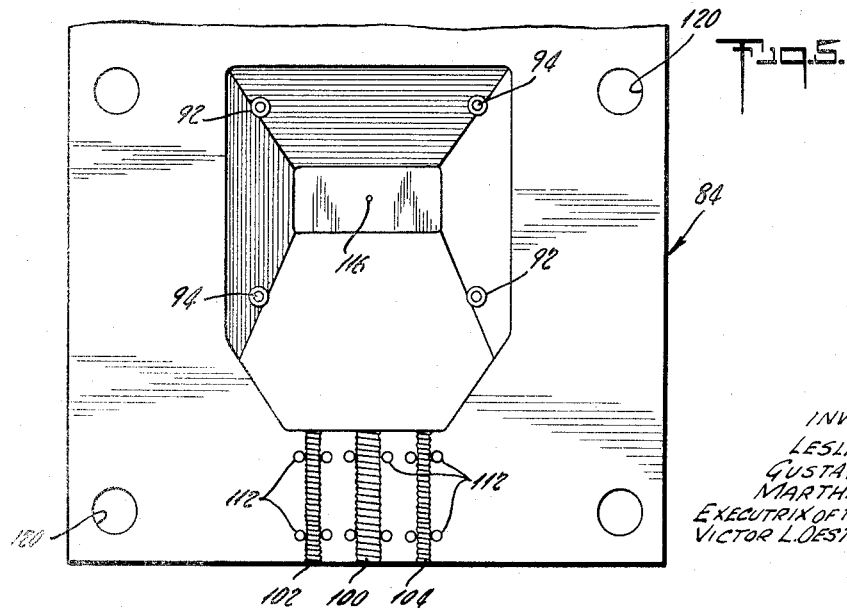

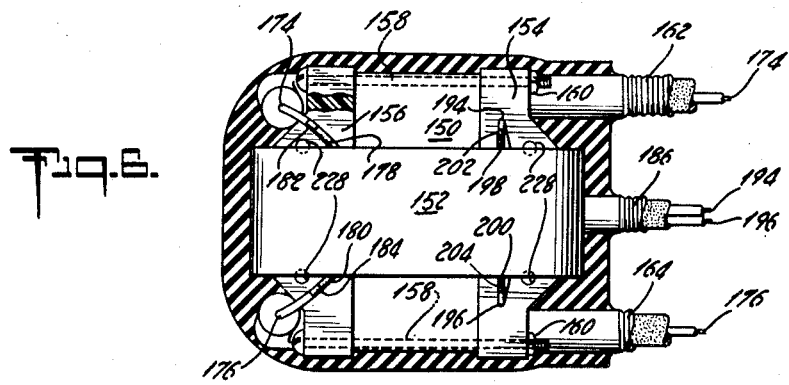
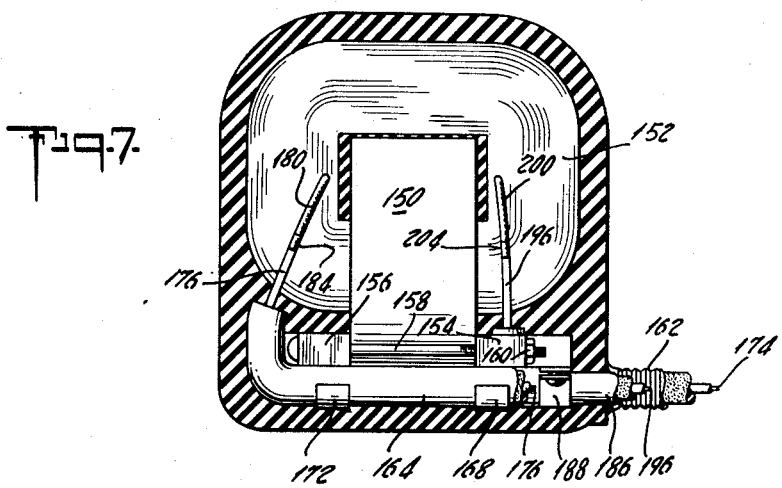
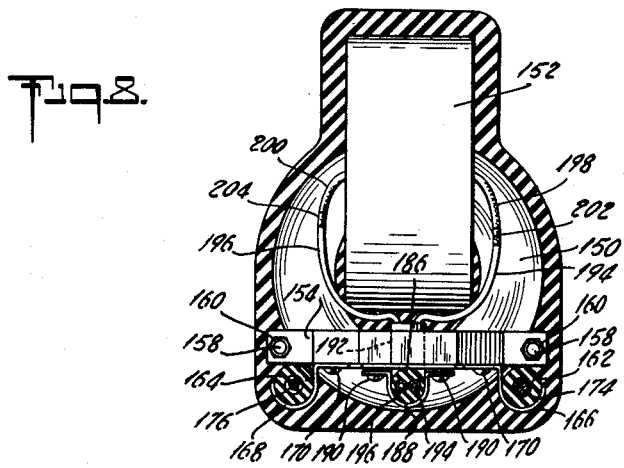

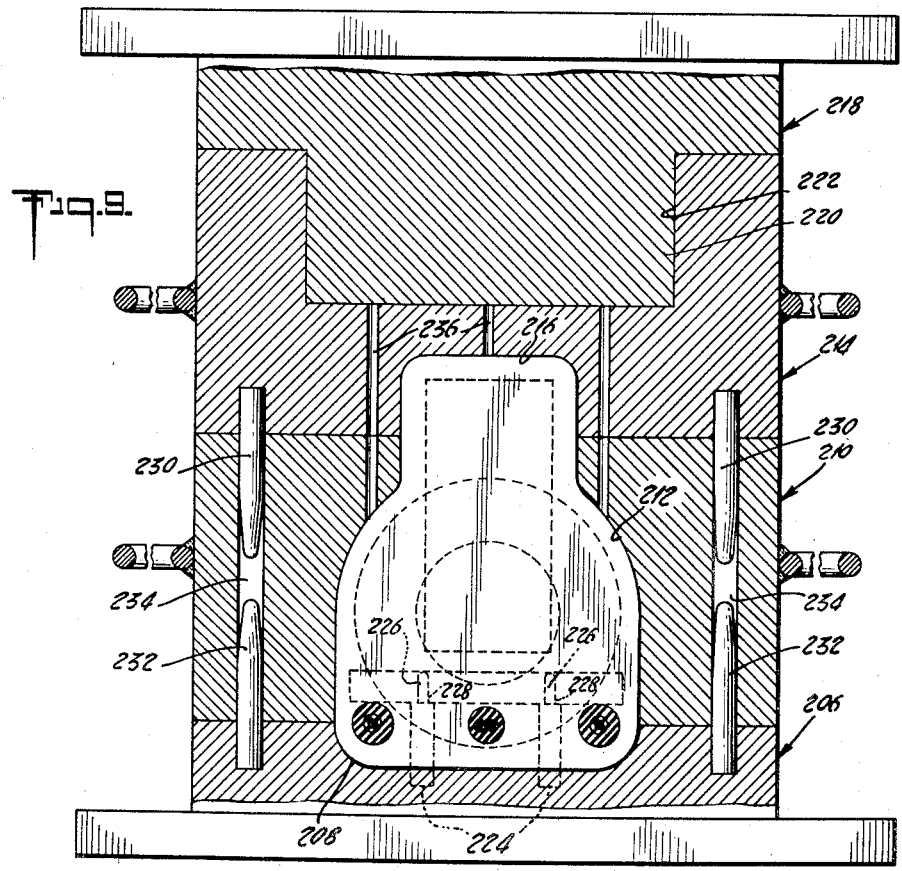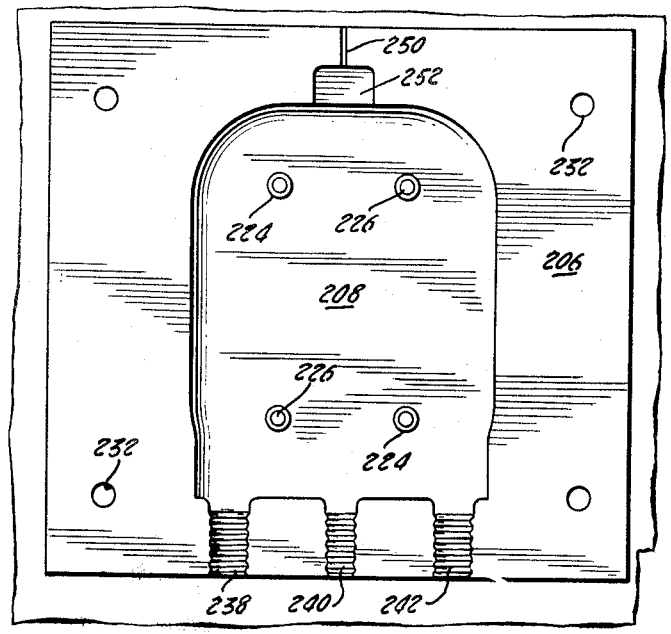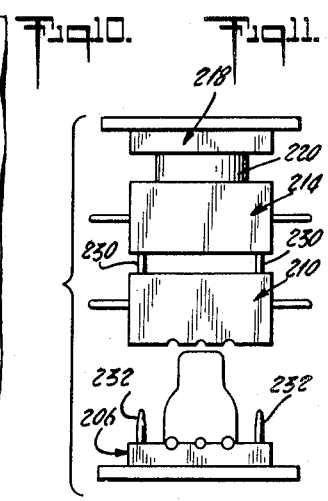

Nov. 29, 1955　　　L. M. MERRILL ET AL　　　2,724,869
METHOD OF EMBEDDING TRANSFORMERS
Original Filed Dec. 10, 1949　　　　　　　　5 Sheets-Sheet 5
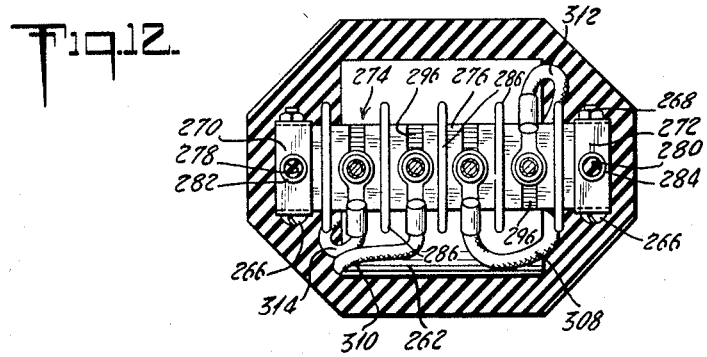
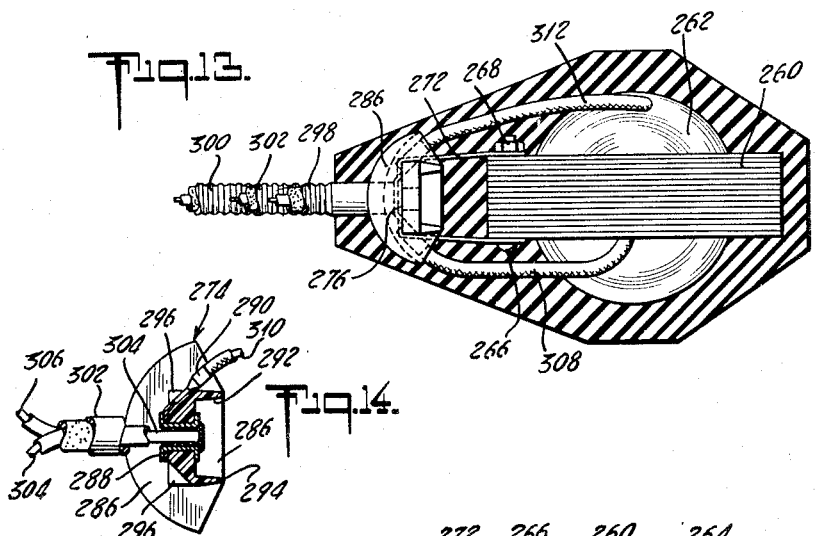
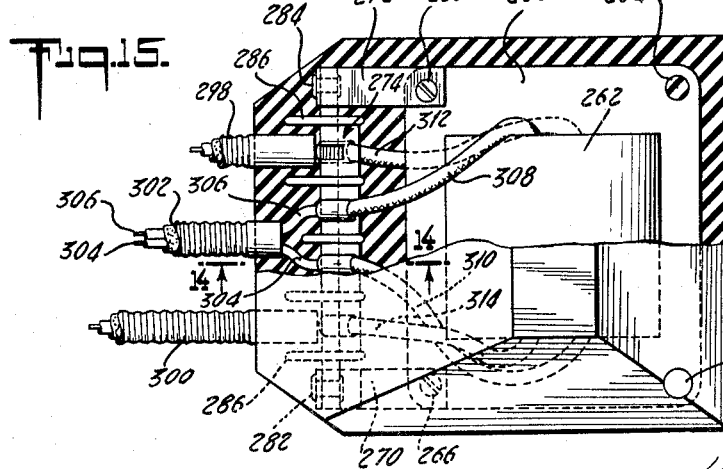
INVENTORS:
LESLIE M. MERRILL
GUSTAV V. KARLSON
MARTHA P. OESTNAES
EXECUTRIX OF THE ESTATE OF
VICTOR L. OESTNAES, DECEASED

United States Patent Office 2,724,869
Patented Nov. 29, 1955

2,724,869
METHOD OF EMBEDDING TRANSFORMERS

Leslie M. Merrill, Wilmington, N. C., Gustav V. Karlson, Belmont, Mass., and Victor L. Oestnaes, deceased, late of Westfield, N. J., by Martha P. Oestnaes, executrix, Westfield, N. J., assignors to Elastic Stop Nut Corporation of America, Union Township, N. J., a corporation of New Jersey Original application December 10, 1949, Serial No. 132,335. Divided and this application May 21, 1954, Serial No. 431,333

1 Claim. (Cl. 18—59)

This application is a division of copending application Serial No. 132,335 filed December 10, 1949, now abandoned.

The present invention relates to transformers and has particular reference to transformers intended for use in circuits for lighting and other purposes of the kind in which a number of transformers are arranged with their primary windings connected at spaced intervals in a common supply or power circuit and with their secondary windings connected respectively to different energy consuming units such as incandescent lamps. Such circuits, in which the transformers are often referred to as isolation transformers, have long been employed for street lighting and within more recent years have been extensively employed in airport lighting for runway and approach light systems and the like. In the majority of such installations the cables of the power circuits and the transformers have been buried in the ground with the transformers removably housed in vaults of metal, ceramics, concrete and the like and with the cables either contained in permanent ducts of similar materials connecting the several vaults, or directly buried in the ground between vaults. Such systems are very expensive, particularly as to installation costs and are moreover relatively expensive in maintenance due to ultimate leakage of ground water and the like into the vaults, with resultant electrical breakdowns traceable to corrosion of metallic transformer cases or seepage of water into the cable entrance of the transformers.

Also, incident to modern military operations, advanced and temporary airfields are necessary for which runway lighting systems are required. For such uses the kinds of installations described above obviously cannot be used, and while so called portable lighting sets for temporary installation above ground have been developed they have not proved to be wholly satisfactory in all particulars and are entirely unsuited for permanent installations.

The general object of the present invention is to improve upon apparatus of the kind under discussion through the provision of a novel form of transformer unit, together with novel apparatus and methods for the manufacture thereof, which will enable isolation transformers for lighting and other purposes to be provided which are capable of vault installation or direct ground burial for permanent installations, or which may be laid above ground where they are exposed to atmospheric conditions, without physical or electrical deterioration over indeterminate periods of time; which are lighter than present apparatus; and which are capable of withstanding the abusive treatment usually unavoidable in military operations.

From the foregoing discussion it will be evident that the invention is directed to transformer units having capacities for transforming substantial amounts of electrical energy in terms of watts or kilowatts and such transformers will hereinafter be designated as power transformers, without limitation as to specific type or design, in order to distinguish them from transformers of the kind utilized in electronic and other applications of the kind which require transformer capacities of only a fraction of a watt or at most only a very few watts.

To the end of accomplishing the above and other and more detailed objects hereinafter appearing, the invention contemplates the provision of a transforrmer unit the core and windings of which are directly encased in a mass of non-metallic material of suitable nature, hereinafter more fully discussed, which is molded around and into the voids of the transformer structure to provide a casing wholly enclosing the transformer structure and with the casing bonded to the sheathing of the input and output cables providing the conductors to and from the transformer windings to provided a hermetic seal between the casing and sheathings, the electrical connections between the conductors and the wires of the windings being located within and enclosed by the molded casing material. Within the framework of this general structure the invention contemplates numerous additional novel and advantageous structural features, the nature and advantages of which together with the methods and means employed to provide them will best be understood from the ensuing portion of this specification, taken in conjunction with the accompanying drawings in which different structural embodiments of the invention and the manner of fabrication thereof are disclosed by way of example but without limitation, the scope of the invention being defined by the appended claims.

In the drawings:

Fig. 1 is a top plan view, partly in section, of a transformer unit embodying the invention;

Fig. 2 is a vertical longitudinal view, partly in elevation and partly in section, of the unit shown in Fig. 1;

Fig. 3 is a vertical transverse view, partly in elevation and partly in section, of the unit shown in Fig. 1;

Fig. 4 is an exploded view partly in section and partly in elevation, of molding apparatus for producing a transformer unit embodying the invention, with a transformer in place preparatory to the molding operation;

Fig. 5 is a top plan view of the lower mold block of Fig. 4;

Fig. 6 is a horizontal longitudinal sectional view, partly in elevation, of a different example of transformer unit embodying the invention;

Fig. 7 is a vertical longitudinal sectional view, partly in elevation, of the unit show in Fig. 6;

Fig. 8 is a vertical transverse section, partly in elevation, of the unit shown in Fig. 6;

Fig. 9 is a vertical section through molding apparatus, with transformer in place, for molding the form of transformer shown in Figs. 6–8;

Fig. 10 is a top plan view of the lower block of the molding apparatus shown in Fig. 9;

Fig. 11 is an exploded elevation on smaller scale of the molding apparatus of Fig. 10;

Fig. 12 is a vertical transverse view, partly in elevation and partly in section, of a further example of transformer unit embodying the invention;

Fig. 13 is a vertical longitudinal view, partly in elevation and partly in section, of the unit shown in Fig. 12;

Fig. 14 is a fragmentary section of larger scale, taken on line 14—14 of Fig. 15; and Fig. 15 is a plan view, partly in section, of the unit shown in Fig. 12.

Referring now to Figs. 1 to 3 of the drawings a transformer unit embodying the invention is indicated generally at 10. In the embodiment illustrated the transformer core 12 is formed in known manner by a number of plate-like metal laminations 14 held in assembled relation by rivets 16 and having suitable apertures through which the coils of the primary and secondary windings of the transformer pass. Since the specific electrical properties of the transformer and the details of the windings are not germane to the present invention the windings are shown generally at 18, it being understood that the wires of these windings are suitably insulated by lacquer coatings or any other form of insulation usual for the purpose. In the persent example, the terminal ends of the primary winding are indicated at 20 and 22, respectively, while the terminal ends of the secondary winding appear at 24 and 26. Cables 28 and 30 provide for the supply of current to the primary winding through metal conductors 32 and 34 connected at 36 and 38 respectively by soldering or any other suitable electrical connecting means to the ends of the primary winding. Similarly the conductors 40 and 42 are connected at 44 and 46 to the ends of the secondary winding. In the present instance the primary conductors are carried in and form parts of separate cables, while the secondary conductors are carried in and form parts of a common cable 48.

In accodance with one of the aspects of the invention the several cables are mechanically anchored to the structure of the transformer so that the windings of the transformer and the joints between their terminals and the cable leads are relieved of all mechanical stresses such as tension created by pull on the cables and forces tending to displace the parts during the operation required to form the casing, as is also the juncture between the cables and the casing enclosing the transformer.

In the present embodiment this is accomplished by the provision of anchoring means in the form of what may be termed a harness, by means of which the ends of the cable are firmly located mechanically with respect to the core of the transformer. This means comprises a pair of eye members 50 and 52, preferably of non-metallic material having relatively strong physical properties and high dielectric strength, such for example as Bakelite or equivalent material. The members 50 and 52 are suitably apertured to fit snugly over the projecting portions of the core at opposite sides of the transformer coil and at one end having projecting tongues 54 and 56 which in turn are provided with apertures 58 ano 60 through which extend the tongues 62 and 64 of a transversely extending anchor bar 66, advantageously of the same material as the eye members. The parts are preferably held in assembled relation by cotter pins or the like as seen at 68. The bar 66 is suitably apertured to permit the cables 28, 30 and 48 to pass through it in spaced relation for connection to the ends of the transformer windings. At the places where the cables pass through the anchor bar they are firmly fixed relative to the bar. In the present instance this is accomplished by means of metal clamping rings such as rings 70 and 72, which are crimped around the cable 48 on opposite sides of the bar to firmly clamp it against movement relative to the bar and to transmit to the latter tension or compressive forces between the cables and the transformer. As will be evident, with this construction the joints between the leads and the windings are relieved from all mechanical strain as are also the terminal end portions of the transformer windings, the latter being particularly important because of the fact that in some instances the wires of the windings are relatively fine with little mechanical strength. Similarly, the primary cables 28 and 30 are anchored by means of clamp rings 74 and 76, and 78 and 80, respectively.

After the above described parts are assembled, the unit is then completed by forming around the transformer structure and the ends of the cables a casing 82 in which the transformer is hermetically sealed and to which the cables are also bonded to provide a hermetic seal between the cables and casing.

In order to achieve the best results and to take full advantage of the potential benefits of the invention, consideration must be given to the material of which the casing is formed.

Primarily, the material must be moldable and in order to be fully satisfactory should possess certain additional properties of which the following are important. It should be non-porous to both gases and liquids and should be substantially impervious to acids and alkalis of the kind and concentrations ordinarily encountered in earth installations. It should be substantially impervious to deterioration from the action of the atmosphere, particularly with reference to sun rays. It should be capable of resisting, without adversely affecting its mechanical and electrical properties, extremes of temperature conditions from subzero temperatures to the high temperatures encountered in above ground installations in tropic or desert locations. It should be relatively firm and nonfranigble and preferably have a certain degree of elasticity. It should be as free as possible from inherent "aging" with time. It should have reasonably good physical properties, particularly the quality of toughness and should have relative high dielectric strength. Furthermore it must be "compatible" with the covering of the cables to which it is bonded, to the extent required to provide a hermetic bond between the casing and the cables. Because of the latter factor, the materials of which the cables are made must be taken into account when selecting the casing material. As previously mentioned, flexible cables suitable for direct ground burial have previously been employed and in the development of such cables it has been found that in the present state of the materials art, the class of materials which most satisfactorily meets requirements of the nature of those noted above are synthetic polymers of compounds productive of products generically known as "synthetic rubber," of which the following may be mentioned as examples: "GR–S" (Government Rubber, Styrene) a polymeric product of butadiene and styrene; "Low Temperature Rubber," also a polymeric product of butadiene and styrene; "neoprene," which is a generic term for a number of chloroprene polymers of different grades and designated as GR–M plus numerical designations for the several grades; "Butyl rubber" a copolymer of isobutylene and isoprene; and "Buna-N" (GR–A, Government Rubber, Acrylonitrile) a copolymer of butadiene and acrylo nitrile. To those skilled in the materials art it will be evident that a substantial variety of materials suitable for the purpose are available and that they need not be limited to synthetic rubbers in order to carry out the invention. Such other materials may include synthetic resins such as "Polythene." Also, while it is possible to mold a casing from natural rubber which can be bonded to cables covered with compatible material, the use of natural rubber is not to be recommended because of its inherent deterioration with time, or so-called "aging" characteristic. The specific material employed will therefore be dictated by specific conditions in different cases, one of which is the covering material of the cables to which the transformer casing must be bonded.

Of the foregoing materials, neoprene is one of the more satisfactory and for purposes of further description herein it will be assumed, without limitation, that neoprene is the material employed.

Also it is to be noted that in the production of cables of the kind under consideration the covering for the wires is often different from that of the outer covering, as for example a core of natural rubber or other insulating material covered by a sheath of neoprene or other material having the desired physical properties noted above. Since the specific internal construction of the cables is not germane to this invention, the term "sheathing" as employed herein is to be considered as referring to the outer covering of the cables regardless of whether that constitutes the sole insulation for the conductors or other insulating materials are used internally of the cable.

In accordance with one of the aspects of the invention, the casing 82 is formed by molding the casing material under pressure around the transformer structure and the ends of the attached cables, with the assembly enclosed in a suitable mold cavity, so that not only is the enclosing casing formed and bonded to the cables but voids in the structure are filled with the molded material, the cavity being suitably vented to permit the escape of air or other gases from the cavity. The pressure molding is ordinarily carried out at elevated temperature but the temperature factor is dependent upon the specific nature of the material being molded, as hereinafter more fully discussed.

While the molding operation may be carried out with different forms of apparatus we have found pot molding apparatus, of the kind now to be described, to be satisfactory for the required purpose.

Referring now to Figs. 4 and 5, a suitable form of such apparatus is shown in which the mold comprises upper and lower mold or die blocks 84 and 86, formed with confronting and mating cavities 88 and 90, respectively, which when the blocks are together form a cavity for the transformer structure. The transformer structure is held in fixed spaced relation to the walls of the cavity by suitable centering means, which in the example shown comprise four studs 92 projecting upwardly in the cavity and shouldered to provide small centering pins 94 adapted to project into suitable holes in the core 12 which rests on the shoulders. Similar studs 96 providing centering pins 98 project downwardly from the upper block 86. The upper and lower blocks are each provided with semi-circular grooves leading from the respective recesses 88 and 90 to the exterior of the blocks, these grooves mating to provide passages for the reception of the cables leading to the transformer when the blocks are closed with a transformer in place, as seen at 100, 102, and 104 in Fig. 5 and at 106 and 108 in Fig. 4.

The walls of the grooves 100, 102, and 104 are transversely ridged by serrations or corrugations, as seen more clearly in Fig. 5, it being understood that the walls of the grooves such as 106 and 108 in the block 86 are similarly formed. Advantageously the transverse ridges may be formed by a helical thread having a rounded or other blunt crest. The diameters of the ridged grooves are such that when the blocks are closed for the molding operation, the cables are tightly clamped by the ridged surfaces to prevent axial displacement of the cables relative to the blocks. Guide pins 112 projecting upwardly from the lower block and adapted to enter holes 114 in the upper block may also be provided for holding the cables in position until the blocks are closed.

The lower block is further provided with a vent passage 116 leading from the cavity 88 to the exterior of the block.

The upper block is provided with depending studs 118 adapted to enter mating holes 120 in the lower block to center the blocks when they are closed and may further be provided with handles 122 for manipulating the block. The upper face of the upper block 86 is recessed to provide a cavity 124 for the reception of the material to be molded, and this cavity is connected with the mold cavity by sprue passages 126 and 128 which at their lower ends communicate with the recess 90 by way of the sprue grooves 130 and 132 cut in the lower face of block 86. A pressure member 134, advantageously having manipulating handles 136 is formed with a depending plunger or piston portion 138 shaped to mate with the cavity 124 (both advantageously being circular) and is further provided with depending centering studs 140 adapted to enter mating holes 142 in block 86.

The general manner in which the molding operation is effected will largely be evident from the drawings. The transformed with its attached cables is first placed in proper position in the cavity of the lower block and the upper and lower blocks brought together. A suitable quantity of the material to be molded is placed in the cavity 124 and the pressure member 134 placed over the upper block 86. The assembly is then placed in a suitable press, indicated in the drawing by lower and upper platens 144 and 146. The required pressure is then applied and the molding material is forced by the plunger 138 out of cavity 124 through the sprue passages into the mold cavity, forcing air and/or gases out of the cavity and the voids in the transformer structure through the vent 116, and filling the cavity to form the desired casing and also to fill the said voids. Since in order to insure the desired filling of the voids throughout the transformer structure, high pressures of the order of a ton or more per square inch are employed, the ridged clamping passages for the cables are employed to prevent internal pressure developed in the mold cavity from forcing the cables out of their respective channels in the die.

While the above describes in general the pressure molding operation, other steps must be taken in connection therewith in order to achieve satisfactory results when using a preferred material such as neoprene which requires heat as well as pressure for proper molding. To supply the required heat, the die blocks and pressure member are maintained at elevated temperature, advantageously of the order of 300° F. for neoprene molding. Such heating may be effected by any suitable means, as for example by conduction from hot press platens or by direct heating by electric resistances or the like.

Also, it is important that prior to the molding operation the transformer structure be heated to desired elevated temperature and "soaked" for a period sufficiently long for the temperature to become stabilized at the desired value. Such preheating serves several purposes, among the most important of which are to insure the driving off of any moisture in the structure, to enable the molded material to thoroughly permeate the structure and fill the many voids therein without risk of "cold shuts," and to shorten the time of the molding cycle. The latter may be particularly important with certain molding materials which are susceptible to "overcuring" with deterioration of desirable physical and electrical properties if subjected to molding temperature for too long a period of time as might be required if the transformer unit were not preheated.

The stabilized preheat temperature to which the transformer is heated will of course depend upon the temperature characteristics of the material to be molded. In general the preferred procedure is to preheat to at least approximately die block temperature and in the event the molded material is of a variety moldable at relatively low temperature the transformer still should be preheated to a temperature capable of thoroughly driving off moisture.

Since the preheated transformer is immediately molded, the cables are attached before the preheating operation, and the method of heating must be selected so that the properties of the attached insulated cables are not impaired electrically or mechanically. It has been found that placing the assembly of transformer and attached cables in an oven at proper temperature and for sufficient time to properly soak it does change the properties of cables of the kinds usually employed, whereas if the transformed is heated by other methods which substantially confine the heating to the transformer itself, damage to the cables is avoided. Accordingly, the transformer is preferably preheated by some such other method, as for example by placing the transformer between heated blocks in contact with the core, to which heat is transmitted by conduction. Other methods may be employed, such as by high frequency induction heating and also by passing current through the windings at substantially higher frequency than that for which the transformer is designed, with consequent heating due to increased hysteresis losses. While the conductors of the cables may have some temperature rise due to conduction from the heated parts to which they are attached, such heating is negligible in effect when methods such as those described are employed.

Furthermore, before the transformer structure is placed in the die, the end portion of the cables which extend into the cavity are suitably prepared to enable the required hermetic bond between the cables and the molded material to be effected. Such preparation will naturally be different with different materials. In many cases where the cable sheathing and the molded material are the same, direct fusion may be obtained without preparation other than proper cleaning of the sheathing and roughening of the surface. In other instances, pretreatment of the cable ends with a suitable bonding agent which may be of a solvent nature with respect to the materials used, may be required. As previously noted, the molding material must be compatible with the cable sheathing, and as herein employed the term compatible is intended to include not only materials directly fusible to each other but materials which by the aid of a bonding agent or agents may be hermetically bonded together, as distinguished from being mechanically joined.

After the molding operation is effected the molded unit is left in the hot die cavity, for a period of time sufficient to enable the molded material to set and to "cure," the period of time varying with the specific nature of the material and the size of the transformer. A curing period of thirty minutes for a transformer unit requiring the injection of about three pounds of Neoprene has been found to be satisfactory.

After the curing period, the die blocks are separated, and the unit removed. When removed from the blocks the unit is left with a number of cavities leading from the exterior to the core as the result of the withdrawal of the locating studs and pins required to hold the transformer structure in fixed position during the molding operation. These holes are plugged with plugs of the molding material, a bonded joint being effected by a solvent or other appropriate means. Since the cavities to be plugged are "blind," the insertion of the plugs is facilitated by evacuating the air from the cavities. This is acomplished by inserting a very fine hollow tube into the passage along one side as the plug is inserted, the tube being connected to a suitable vacuum pump, and then withdrawing the tube before the bond between the parts has set, so that the minute aperture left by the tube is closed by the resilient action of the material.

The invention is readily applicable to many different forms of transformer structures and by way of example the application of the invention to a transformer having a coil type core is illustrated in Figs. 6 to 8. In this structure the core 150 is formed by a strip of sheet metal wound upon itself to provide an annular core through the central aperture of which the windings of the primary and secondary coils of the transformer, designated generally at 152, pass.

A pair of anchoring members 154 and 156, of bakelite or the like, are rigidly clamped to the core by means of bolts 158 and nuts 160. The primary cables 162 and 164 are anchored to member 154 by means of metal clips 166 and 168 held by screws 170 threaded into member 154 and are also anchored to member 156 by similar clips, one of which appears at 172 in Fig. 7. Inwardly of the second set of clamps the conductors 174 and 176 of the cables are joined respectively to the ends 178 and 180 of the primary winding by suitable joints indicated at 182 and 184. The secondary cable 186 is fixed to the member 154 by a metal clamp 188 held by screws 190 and on the inner side of the clamp is bent sharply upwardly to pass through a suitable hole 192 in member 154, which appears in dotted lines in Fig. 8. Cable 186 carries both secondary conductors 194 and 196, which are connected respectively to the ends 198 and 200 of the secondary winding by means of suitable joints 202 and 204. As will be evident from the foregoing, the cables are firmly harnessed to the core, to which external stresses such as result from pull on the cables, are transmitted, thus relieving the conductors, joints and windings of strain.

In Figs. 9, 10, and 11, suitable molding apparatus is shown which in this instance comprises a lower block 206 recessed at 208, an intermediate block 210 having a through-recess 212 and upper block 214 having a recess 216 and a pressure member 218 having a plunger 220 adapted to enter a second recess 222 in the upper block. Shouldered studs 224 provide locating pins 226 which enter holes 228 (Fig. 6) formed in the anchor members 154 and 156. When closed the blocks are centered by studs 230 and 232 projecting from the upper and lower blocks respectively and entering bores 234 in the intermediate block, and the recesses 208, 212 and 216 together form the die cavity, which is connected with the material receiving cavity 222 in the upper block by the sprue passages 236 formed in the intermediate and upper blocks. Channels 238, 240, and 242 are provided by mating grooves in the lower and intermediate blocks for the reception of the cables, the walls of the passages also preferably being provided with transverse ridges to engage the cables in a compressive grip. The lower block is grooved to provide a vent 250 and there is also preferably provided a shallow recess 252 into which excess material is extruded during the molding operation to form a flap which can be sheared off after the transformer unit is removed from the mold.

So far as the molding operation and the steps incident thereto both before and after the molding are concerned, the previous discussion in connection with the first embodiment described applies and therefore need not be repeated in connection with the present example.

As previously noted, the specific nature of the transformer, particularly as to its electrical characteristics, is not germane to the present invention, but for best results certain factors of design and construction should be given consideration. The design should be such that the molded material should have access to all current carrying surfaces and the connections between the conductors of the cables and the transformer windings should be of a permanent nature, as by soldering or brazing, and the joints should be free from sharp projecting edges or points productive of corona effect. Further, the arrangement should be such as to place the greatest practical amount of insulating material between different conductors at different potentials.

To this end the anchoring means may be constructed to provide an additional insulating or dielectric barrier between the joints at the ends of the several conductors and in Figs. 12 to 15 another form of unit is shown which employs a transformer of the same construction as shown in Fig. 1 but in which the means for joining the conductors to the windings and for anchoring the cables is somewhat different from the previously described embodiments.

In the present example the transformer has a flat laminated core 260 and associated primary and secondary windings indicated generally at 262. At two corners, the laminations may be secured by rivets 264 and at the remaining corners they are held by through bolts 266 and nuts 268. Two sheet metal loops 270 and 272 have apertured ends through which the bolts pass to fix the loops to the armature. The midportions of the loops pass in front of the end portions of an anchor member 274 made of relatively strong material of high dielectric strength. Advantageously this may be of a molded synthetic resin, nylon being a suitable material. In the present instance the member 274 is formed with a main flat web 276 having apertures 278 and 280 at its ends through which hollow rivets 282 and 284 pass to rivet the member to the loops 270 and 272. Intermediate its ends the member is formed with a series of spaced laterally projecting flanges or barriers 286, there being five in the present instance, and between each two barriers the web is apertured and a hollow metal grommet or hollow rivet 288 passing through each aperture is riveted to the web, as seen more clearly in Fig. 14. Under the outer flange of each rivet 288 a metal connector 290 is secured, the connector having at one end an apertured tab portion through which the rivet passes and at its other end having a socket for the reception of the coil wire to which the connector is soldered or brazed to provide a permanent joint. The member 274 is further provided with laterally extending strengthening webs 292 and 294 and the forward face of web 276 is advantageously bevelled at 296 between the several barriers to avoid the necessity for sharp bends in the tab portions of the connectors. As in the previous embodiment, the primary cables 298 and 300 are spaced apart with the secondary cable 302, carrying two conductors 304 and 306, between them. As shown in Figs. 14 and 15 the two conductors are separated to pass through adjacent rivets 288 to which they are soldered or brazed to form permanent connections, the conductors preferably being headed over at the inner ends of the rivets to provide greater resistance against being pulled out. The ends 308 and 310 of the secondary winding are soldered or brazed to the appropriate connectors 290. Similarly, the ends 312 and 314 of the primary winding are fixed to the connectors associated with the rivets to which the primary cable leads are fixed.

As will be evident from the drawings, the several cables are firmly anchored to the transformer core through the medium of the metal conductors, and a positive and permanent electrical connection is established between the conductors and the transformer windings. Also as will be evident from the drawings, the flanges or barriers 286 between adjacent joints provide means in addition to the molded material for isolating the joints from each other to minimize the possibility of electrical leakage within the transformer between joints at substantially different potentials. Since the configuration of the transformer or unit shown in Figs. 12–15 is essentially the same as that shown in Figs. 1–3, it will be obvious that insofar as molding apparatus and procedure is concerned, that shown and described in connection with Figs. 4 and 5 is applicable.

While in the foregoing, pot molding operations have been described, by way of example, in which all of the molded material is forced from one mold cavity to another in which the transformer is located, it is to be pointed out that since in most instances a relatively thick casing is formed around the transformer, and the molding operation is ordinarily carried out at high temperature and accompanied by a subsequent curing period at high temperature, part of the required quantity of molding material may be packed around the transformer in the mold cavity, in sheet or other form, before the mold blocks are closed, so the entire quantity of molding material required for the casing does not have to be transferred by the molding operation. Also, it will be understood that insofar as the invention is concerned, injection molding machines of the kind used for plastics molding may be employed.

From the foregoing it will be evident that many different specific forms of transformer units may be produced through the use of numerous different specific forms of apparatus and modes of procedure applied to a variety of materials, without departing from the principles of the invention the scope of which is to be understood as embracing all articles, appartus and methods falling within the purview of the appended claim.

What is claimed:

The method of making a transformer having a core-coil assembly and a protective casing of molded non-metallic material around said assembly and cables extending from the transformer assembly comprising metallic conductors connected to the coils of said assembly and covered by sheathing of non-metallic protective material, by the aid of a mold comprising separable die blocks providing therebetween a mold cavity and passages extending from said cavity to the exterior of the mold, which includes the steps of fixing the core-coil assembly, together with the metallic conductors of said cables connected to the terminal ends of the windings of the coils of said assembly, with the core-coil assembly in said cavity in predetermined relation to the walls thereof and with the connected cables extending through said passages with an appreciable length of the sheathing of said cables located within and having ends terminating within said cavity, forcing a moldable casing material compatible with the material of said sheathing into said cavity under pressure to form the desired casing extending around said assembly and around the portions of said sheathing exposed within the cavity to bond the material forming the casing to the sheathing of the cables, and clamping the sheathing of the portions of said cables passing through said passages in the walls of the mold to prevent extrusion of the sheathing from the die cavity outwardly through said passages due to pressure exerted by the molding material forced into the cavity on the exposed ends of the sheathing within the cavity.

References Cited in the file of this patent

UNITED STATES PATENTS

| | | |
|---|---|---|
| 1,333,004 | Vaughn | Mar. 9, 1920 |
| 1,982,279 | Apple | Nov. 27, 1934 |
| 2,391,038 | Rifenbergh | Dec. 18, 1945 |
| 2,413,897 | Wilson | Jan. 7, 1947 |
| 2,534,119 | Gethmann | Dec. 12, 1950 |